United States Patent
Park et al.

(10) Patent No.: US 6,317,437 B1
(45) Date of Patent: *Nov. 13, 2001

(54) ADAPTIVE MULTIPLEXING/ DEMULTIPLEXING METHOD AND MULTIPLEXER/DEMULTIPLEXER THEREFOR

(75) Inventors: Dong-seek Park, Daegu (KR); John Villasenor, Los Angeles, CA (US)

(73) Assignees: Samsung Electronics, Co., Ltd., Kyungki-do (KR); University of California, Oakland, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 09/393,362

(22) Filed: Sep. 10, 1999

Related U.S. Application Data

(63) Continuation-in-part of application No. 08/938,018, filed on Sep. 22, 1997, now Pat. No. 6,034,968.

(51) Int. Cl.[7] ........................................................ H04J 3/16
(52) U.S. Cl. ............................. 370/465; 370/535; 370/536
(58) Field of Search ..................................... 370/465–468, 370/535–541, 389; 379/100.06, 100.12, 200–202, 219, 260

(56) References Cited

U.S. PATENT DOCUMENTS

| | | | | |
|---|---|---|---|---|
| 4,244,046 | * | 1/1981 | Brouard et al. | 370/541 |
| 5,313,461 | * | 5/1994 | Ahl et al. | 370/465 |
| 5,506,903 | * | 4/1996 | Yamashita | 370/465 |

* cited by examiner

*Primary Examiner*—Wellington Chin
*Assistant Examiner*—Prenell Jones
(74) *Attorney, Agent, or Firm*—Sughrue, Mion, Zinn, Macpeak & Seas, PLLC

(57) ABSTRACT

An adaptive multiplexing/demultiplexing method, and a multiplexer/demultiplexer (MUX/DEMUX) using the same and a computer readable medium including software for implementing the same in an H.324M system, are provided. The adaptive MUX/DEMUX in the H.324M system includes one or more MUX/DEMUXs having different complexities, between an H.223/Annex C MUX/DEMUX and an H.223 MUX/DEMUX.

26 Claims, 3 Drawing Sheets

ADAPTIVE MULTIPLEXING/ DEMULTIPLEXING METHOD AND MULTIPLEXER/DEMULTIPLEXER THEREFOR

This application is a continuation-in-part of Ser. No. 08/938,018 filed Sep. 22, 1997 now U.S. Pat. No. 6,034,968.

BACKGROUND OF THE INVENTION

1. Field of the Invention

The present invention relates to an adaptive multiplexing/demultiplexing method, and a multiplexer/demultiplexer using the same in the H.324M system, and more particularly, to an adaptive multiplexing/demultiplexing method capable of being effectively used in an error-prone channel, and a multiplexer/demultiplexer using the method.

2. Description of the Related Art

In general, the H.324M recommendation prescribes a multiplexing of video and audio signals which is effective in an errorprone channel such as a wireless channel, and includes H.223 multiplexing, H.223/Annex C multiplexing, H.245 controlling, a H.263 video coder/decoder (CODEC) and a G.723.1 audio CODEC. Particularly, according to the H.223 recommendation, in order to achieve video telephone and video conferencing in a general digital telecommunication network by the ITU-T (the Telecommunication standardization sector of the International Telecommunication Union), video, audio and other data are adaptively multiplexed in protocol data units (PDU) and then later demultiplexed. An H.223 multiplexer/demultiplexer (MUX/DEMUX) can be used when a channel bit error rate is $10^{-6}$ or less. An H.223/Annex C MUX/DEMUX is a new MUX/DEMUX capable of improving error robustness, obtained by adding rate compatible punctured convolutional coder/decoder (RCPC CODEC) and automatic retransmission on request (ARQ) functions to the H.223 MUX/DEMUX. According to the H.223/Annex C MUX/DEMUX, when an error occurs in a receiver, the RCPC-encoded data is retransmitted by a transmitter at different rates.

However, it is nearly impossible to use the H.223 MUX/DEMUX in an error-prone channel due to its low error-resiliency. Also, in the case of the H.223/Annex C MUX/DEMUX channel throughput is steeply decreased due to the ARQ, and there is extremely high complexity due to the RCPC. A measure of complexity can be determined by the amount or type of error protection components included in a multiplexing/demultiplexing scheme, for example.

SUMMARY OF THE INVENTION

To solve the above problems, it is an object of the present invention to provide an adaptive multiplexing/demultiplexing method and a multiplexer/demultiplexer (MUX/DEMUX) using the same, in which a plurality of MUX/DEMUXs having different complexities are defined between the H.223 MUX/DEMUX and the H.223/Annex C MUX/DEMUX, so that the multiplexing can be achieved selectively according to specific circumstances by selecting between the plurality of MUX/DEMUXs, to match a particular circumstance via a trade-off of overhead of the MUX/DEMUXs.

According to an aspect of the object, there is provided an adaptive multiplexing/demultiplexing method in an H.324M system, the method comprising the steps of: (a) performing a first multiplexing/demultiplexing process having at least one of: the complexity and performance of the H.223 recommendation; (b) performing a second multiplexing/demultiplexing process having at least one of: the complexity of the H.223/Annex C recommendation; and (c) inserting one or more of a third type of multiplexing/demultiplexing processing having at least one of different complexities and performance levels from the steps (a) and (b)

Preferably, the third multiplexing/demultiplexing process of the step (c) uses a high-level data link control (HDLC) flag including an extra pseudo-random noise (PN) code having more bits than the H.223 recommendation.

Preferably, the third multiplexing/demultiplexing process of the step (c) comprises the substeps of: (c1) using an HDLC flag including an extra PN code having more bits than the H.223 recommendation; and (c2) using a header having more bits than the H.223 recommendation.

Preferably, the third multiplexing/demultiplexing process of the step (c) comprises the substeps of: (c1) using an HDLC flag including an extra PN code having more bits than the H.223 recommendation; (c2) using a header having more bits than the H.223 recommendation; and (c3) using error protection bits in either an adaptation layer or a multiplexer layer.

According to another aspect of the object, there is provided an adaptive multiplexer/demultiplexer (MUX/DEMUX) in an H.324M system, comprising: an H.223 MUX/DEMUX; an H.223/Annex C MUX/DEMUX; and one or more intermediate MUX/DEMUXs between the H.223/Annex C MUX/DEMUX and the H.223 MUX/DEMUX, having different complexities to the H.223/Annex C MUX/DEMUX and the H.223 MUX/DEMUX.

Preferably, the one or more intermediate MUX/DEMUXs uses a high-level data link control (HDLC) flag including an extra pseudo-random noise (PN) code having more bits than the H.223 recommendation.

Preferably, the one or more intermediate MUX/DEMUXs uses an HDLC flag including an extra PN code having more bits than the H.223 recommendation, and a header having more bits than the H.223 recommendation.

Preferably, the one or more intermediate MUX/DEMUXs uses an HDLC flag including an extra PN code having more bits than the H.223 recommendation, a header having more bits than the H.223 recommendation, and error protection bits in either an adaptation layer or a multiplex layer.

BRIEF DESCRIPTION OF THE DRAWINGS

The above object and advantages of the present invention will become more apparent by describing in detail preferred embodiments thereof with reference to the attached drawings in which.

DESCRIPTION OF THE PREFERRED EMBODIMENTS

Figure 1:
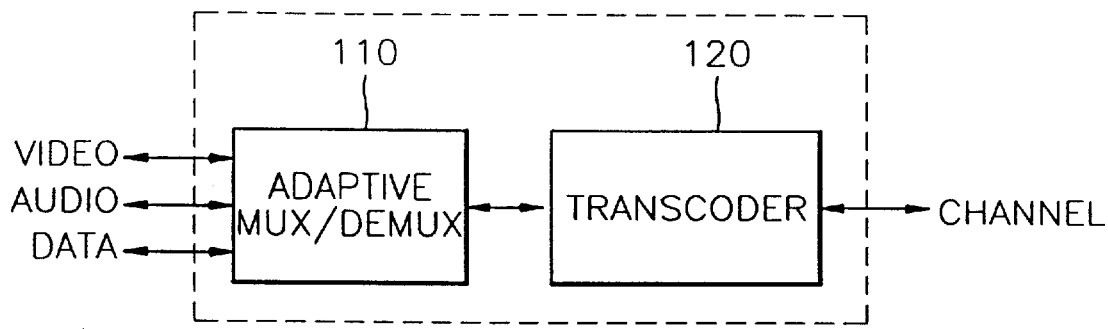
FIG. 1 is a diagram showing the structure of the H.324M system for a public switched telephone network (PSTN), in which the present invention is applied.

An H.324M system for a public switched telephone network (PSTN), shown in FIG. 1, includes an adaptive multiplexer/demultiplexer (MUX/DEMUX) 110 and a transcoder 120. First, media data (video, audio and other data) are coded, and the coded media data is then multiplexed by the adaptive MUX/DEMUX 110 and the transcoder 120 to form a protocol data unit (PDU) (not shown), and then transmitted through a channel.

Figure 2A:
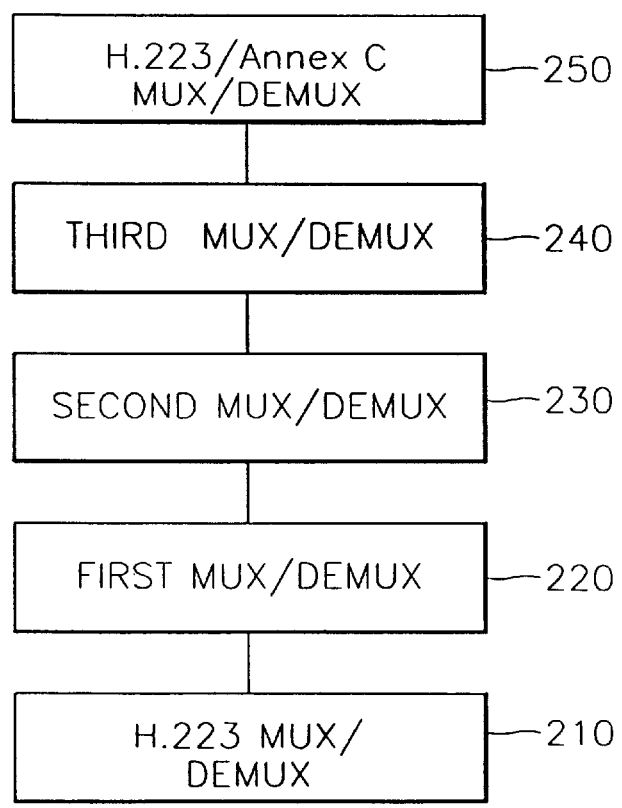
FIG. 2A is a block diagram of the adaptive MUX/DEMUX of FIG. 1 according to an embodiment of the present invention.

FIG. 2A is a block diagram of the adaptive MUX/DEMUX 110 of FIG. 1 according to an embodiment of the present invention. The adaptive MUX/DEMUX 110 shown in FIG. 2A includes an H.223 MUX/DEMUX 210, a first MUX/DEMUX 220 obtained by applying a long HDLC flag to the MUX-PDU of the H.223 MUX/DEMUX 210, a second MUX/DEMUX 230 obtained by applying a long header to the MUX-PDU of the first MUX/DEMUX 220, a third MUX/DEMUX 240 obtained by applying an error bit to the MUX-PDU of the second MUX/DEMUX 230, and an H.223/Annex C MUX/DEMUX 250.

In the adaptive MUX/DEMUX 110 according to the present invention, as shown in FIG. 2A, a transcoding option is inserted between the H.223 MUX/DEMUX 210 having lower and the H.223/Annex C MUX/DEMUX 250 having high complexity, to define a new multiplexing/demultiplexing method by using the plurality of MUX/DEMUXs having different complexities and performance levels, i.e., the first MUX/DEMUX 220, the second MUX/DEMUX 230 and the third MUX/DEMUX 240.

Figure 3A:
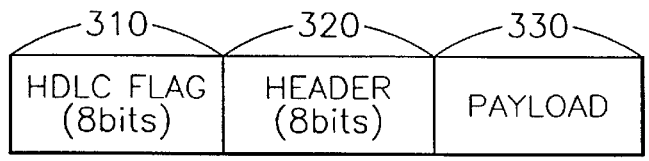
FIG. 3A is a diagram showing the structure of a multiplex protocol data unit (MUX-PDU) of a general H.223 MUX/DEMUX.

FIG. 3A is a diagram showing the structure of a multiplex-protocol data unit (MUX-PDU) of the general H.223 MUX/DEMUX 210. The MUX-PDU of the H.223 MUX/DEMUX 210 includes an 8-bit high-level data link control (HDLC) flag 310 used for controlling transmission, an 8-bit header 320 including data information, and a payload 330 including video and audio data. Here, the MUX-PDU is the minimal unit generated by multiplexing the audio and video data in the MUX, and is generated before the channel interfacing. Also, the HDLC flag 310 is a unique bit pattern of six successive is (for example, 01111110), representing a start or end of a frame.

Figure 3B:
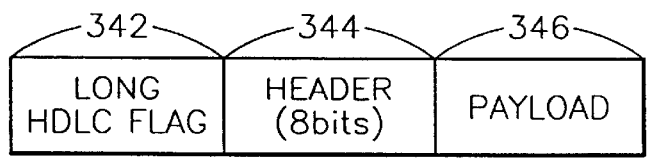
FIG. 3B is a diagram showing the structure of the MUX-PDU of a first MUX/DEMUX.

FIG. 3B is a diagram showing the structure of a MUX-PDU of the first MUX/DEMUX 220 which operates as a high-level MUX/DEMUX of the H.223 MUX/DEMUX 210. The MUX-PDU of the first MUX/DEMUX 220 includes a long HDLC flag 342 of 8 bits or more having more bits than the H.223 recommendation, an 8-bit header 344 including data information, and a payload 346 including video and audio data. The first MUX/DEMUX 220 adopts an HDLC flag of more bits as shown in FIG. 3B in order to improve synchronization between video and audio signals in the MUX-PDU of the H.223 MUX/DEMUX 210. Thus, in order to maximize the synchronization, an extra flag having bits similar to those of pseudo-random noise (PN) having a high auto-correlation is inserted in the portion of the HDLC flag.

Figure 3C:
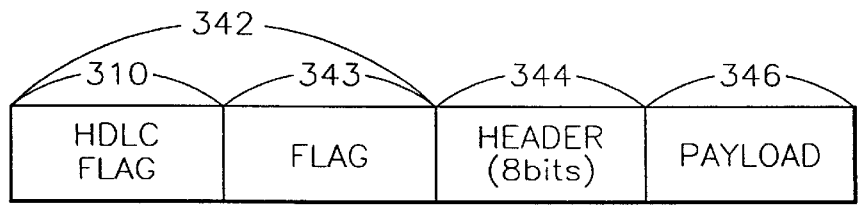
FIG. 3C is a diagram showing an example where a first flag is applied to a long HDLC flag of FIG. 3B.

FIG. 3C is a diagram showing an example where a first flag 343 is applied in the long HDLC flag 342 of FIG. 3B.

Figure 3D:
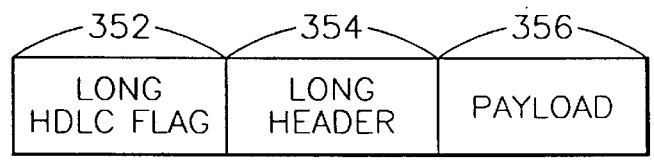
FIG. 3D is a diagram showing the structure of the MUX-PDU of a second MUX/DEMUX.

FIG. 3D is a diagram showing the structure of a MUX-PDU of the second MUX/DEMUX 230 which operates as a high-level MUX/DEMUX of the first MUX/DEMUX 220. The MUX-PDU of the second MUX/DEMUX 230 includes a long HDLC flag 352 having more bits than the H.223 recommendation, a long header 354 including more bits than the H.223 recommendation, and a payload 356 including video and audio data. The second MUX/DEMUX 230 adopts a header of more bits as well as the long HDLC flag applied to the MUX-PDU of the first MUX/DEMUX 220, in order to improve synchronization between video and audio signals. Here, the long header-354 may be used for error protection.

Figure 3E:
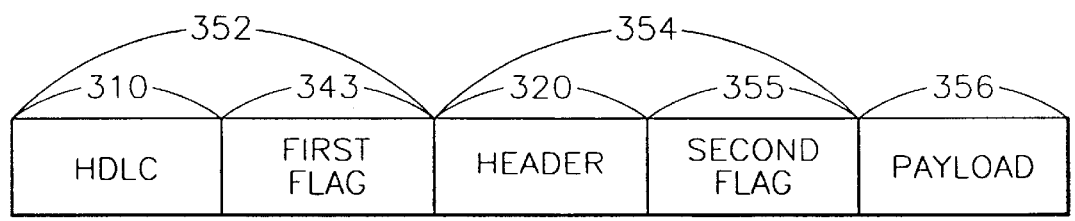
FIG. 3E is a diagram showing an example where a first flag and a second flag are applied to a long HDLC flag and a long header of FIG. 3D, respectively.

FIG. 3E is a diagram showing an example where first and second flags 343 and 355 are applied in the long HDLC flag 353 and the long header 354, respectively.

The third MUX/DEMUX 240 of FIG. 2A operates a high-level MUX/DEMUX of the second MUX DEMUX 230 and a low-level MUX/DEMUX of the H.223/Annex C MUX/DEMUX 250, and the MUX-PDU of the third MUX/DEMUX 240 additionally includes an error protection bit in an adaptation layer or a multiplex layer, as well as the components of the MUX-PDU of the second MUX/DEMUX 230. Thus, the third MUX/DEMUX 240 increases the error-resiliency with respect to the channel CODEC.

Figure 2B:
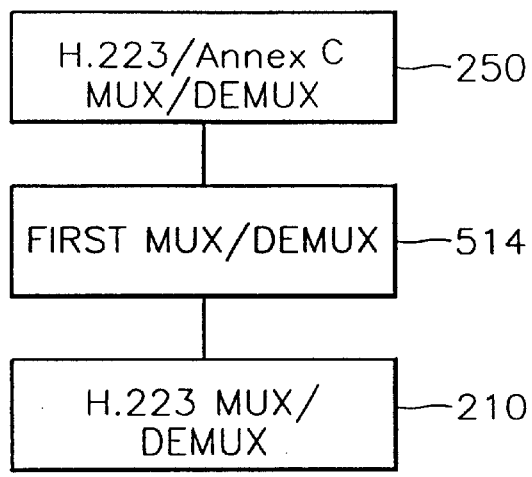
FIG. 2B is a block diagram of the adaptive MUX/DEMUX of FIG. 1 according to another embodiment of the present invention.

FIG. 2B is a block diagram of the adaptive MUX/DEMUX 110 of FIG. 1 according to another embodiment of the present invention. Here, only a first MUX/DEMUX 514, corresponding to the first MUX/DEMUX 220 of FIG. 2A, is inserted between an H.223 MUX/DEMUX 210 and an H.223/Annex C MUX/DEMUX 250.

Figure 2C:
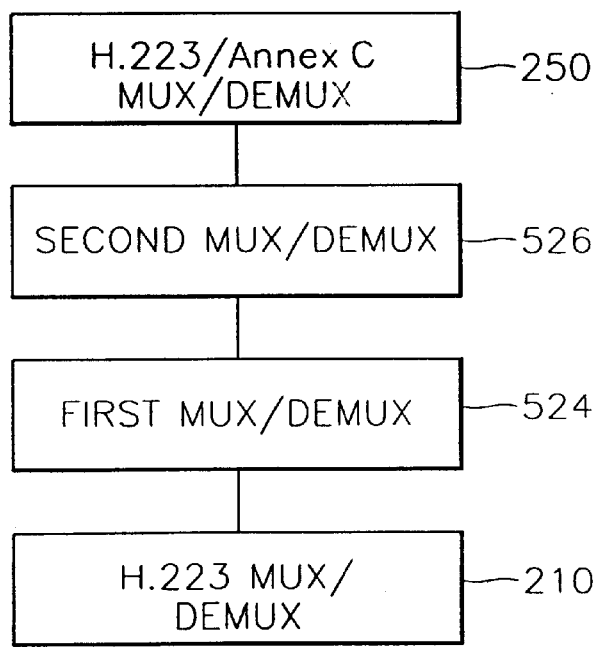
FIG. 2C is a block diagram of the adaptive MUX/DEMUX of FIG. 1 according to still another embodiment of the present invention.

FIG. 2C is a block diagram of the adaptive MUX/DEMUX 110 of FIG. 1 according to still another embodiment of the present invention. Here, a first MUX/DEMUX 524, corresponding to the first MUX/DEMUX 220 of FIG. 2A, and a second MUX/DEMUX 526, corresponding to the second MUX/DEMUX 230 of FIG. 2A, are inserted between an H.223 MUX/DEMUX 210 having lower complexity and an H.223/Annex C MUX/DEMUX 250 having high complexity.

As described above, in the adaptive multiplexing/demultiplexing method and a MUX/DEMUX using the same according to the present invention, a plurality of MUX/DEMUXs having different complexities are selectively inserted between an H.223 MUX/DEMUX and an H.223/Annex C MUX/DEMUX in an H.324M system, thereby improving error-resiliency and performance according to the circumstances. In other words, the intermediate MUX/DEMUXs have different complexities, which in turn provide intermediate performance levels than that provided by the less complex H.223 recommendation and the more complex H.223 Annex C recommendation. A measure of performance level can be determined by the amount of errors occurring in the received via the multiplexing/demultiplexing scheme, for example.

The multiplexing/demultiplexing described above with reference to FIGS. 2A–2C and 3A–3E may be implemented by software stored to a computer readable medium. The software includes computer readable program means for implementing the multiplexing and demultiplexing according to the H.223 standard, which has relatively low complexity, and according to the H.223 Annex C standard, which has relatively high complexity. Multiplexing/demultiplexing of intermediate complexity and performance is disposed therebetween. The software further implements and responds to the various HDLC flags, PN codes and header information for the various levels of multiplexing and demultiplexing complexity and performance.

Though the above provides descriptions of preferred embodiments of the invention, the invention is not limited thereto. One skilled in the art would understand that various modifications can be made, which are within the spirit and scope of the appended claims. For instance, ongoing modifications to the standards mentioned herein are deemed to be within the scope of the appended claims.

What is claimed is:

1. An adaptive multiplexing/demultiplexing method in an audio/visual system using H.223 and H.223 Annexes, the method comprising steps of:

(a) performing a first multiplexing/demultiplexing process having at least one of: the complexity and performance of the H.223 recommendation;

(b) performing a second multiplexing/demultiplexing process having at least one of the complexity and performance of the H.223/Annex C recommendation; and (c) inserting one or more intermediate multiplexing/demultiplexing processes having at least one of different complexities and performance levels from the multiplexing/demultiplexing processes of steps (a) and (b).

2. The method of claim 1, wherein the intermediate multiplexing/demultiplexing process of the step (c) uses a high-level data link control (HDLC) flag having more bits than the H.223 recommendation.

3. The method of claim 2, wherein the HDLC flag includes an extra pseudo-random noise (PN) code.

4. The method of claim 1, wherein the intermediate multiplexing/demultiplexing process of the step (c) comprises the substeps of:

(c1) using a high-level data link control (HDLC) flag having more bits than the H.223 recommendation; and (c2) using a header having more bits than the H.223 recommendation.

5. The method of claim 4, wherein the HDLC flag includes an extra pseudo-random noise (PN) code.

6. The method of claim 1, wherein the intermediate multiplexing/demultiplexing process of the step (c) comprises the substeps of:

(c1) using a high-level data link control (HDLC) flag having more bits than the H.223 recommendation;

(c2) using a header having more bits than the H.223 recommendation; and (c3) using error protection bits in either an adaptation layer or a multiplexer layer.

7. The method of claim 6, wherein the HDLC flag includes an extra pseudo-random noise (PN) code.

8. An adaptive multiplexer/demultiplexer (MUX/DEMUX) in an H.324M system, comprising:

an H.223 MUX/DEMUX;

an H.223/Annex C MUX/DEMUX; and one or more intermediate MUX/DEMUXs between the H.223/Annex C MUX/DEMUX and the H.223 MUX/DEMUX, having different complexities from the H.223/Annex C MUX/DEMUX and the H.223 MUX/DEMUX.

9. The MUX/DEMUX of claim 8, wherein the one or more intermediate MUX/DEMUXs use a high-level data link control (HDLC) flag having more bits than the H.223 recommendation.

10. The MUX/DEMUX of claim 9, wherein the HDLC flag includes an extra pseudo-random noise (PN) code.

11. The MUX/DEMUX of claim 8, wherein the one or more intermediate MUX/DEMUXs uses a high-level data link control (HDLC) flag having more bits than the H.223 recommendation, and a header having more bits than the H.223 recommendation.

12. The MUX/DEMUX of claim 11, wherein the HDLC flag includes an extra pseudo-random noise (PN) code.

13. The MUX/DEMUX of claim 8, wherein the one or more intermediate MUX/DEMUXs uses a high-level data link control (HDLC) flag having more bits than the H.223 recommendation, a header having more bits than the H.223 recommendation, and error protection bits in either an adaptation layer or a multiplex layer.

14. The MUX/DEMUX of claim 13, wherein the HDLC flag includes an extra pseudo-random noise (PN) code.

15. A computer readable medium operable to implement an adaptive multiplexing/demultiplexing method in an H.324M system, the computer readable medium including:

(a) a computer readable program means for performing a first multiplexing/demultiplexing process having the complexity of the H.223 recommendation;

(b) a computer readable program means for performing a second multiplexing/demultiplexing process having the complexity of the H.223/Annex C recommendation; and (c) a computer readable program means for implementing one or more intermediate multiplexing/demultiplexing processes having a different level of complexity from said first and second multiplexing/demultiplexing processes.

16. The computer readable medium of claim 15, wherein the computer readable program means for implementing the intermediate multiplexing/demultiplexing process uses a high-level data link control (HDLC) flag having more bits than the H.223 recommendation.

17. The computer readable medium of claim 16, wherein the HDLC flag includes an extra pseudo-random noise (PN) code.

18. The method of claim 15, wherein the computer readable program means for implementing the intermediate multiplexing/demultiplexing process comprises:

(c1) computer readable program means using a high-level data link control (HDLC) flag having more bits than the H.223 recommendation; and (c2) computer readable program means using a header having more bits than the H.223 recommendation.

19. The computer readable medium of claim 18, wherein the HDLC flag includes an extra pseudo-random noise (PN) code.

20. The computer readable medium of claim 19, wherein the computer readable program means for implementing the intermediate multiplexing/demultiplexing comprises:

(c1) computer readable program means for using a high-level data link control (HDLC) flag having more bits than the H.223 recommendation;

(c2) computer readable program means for using a header having more bits than the H.223 recommendation; and (c3) computer readable program means for using error protection bits in either an adaptation layer or a multiplexer layer.

21. The method of claim 1, wherein said intermediate multiplexing/demultiplexing processes includes a first intermediate process that has a process more complex than the H.223 recommendation and less complex than the H.223 Annex C recommendation and further includes a second intermediate process having complexity greater than said first intermediate process and less than said H.223 Annex C recommendation.

22. The multiplexer/demultiplexer of claim 8, wherein said intermediate MUX/DEMUX includes a first intermediate MUX/DEMUX that is more complex than the H.223 recommendation and less complex than the H.223 Annex C recommendation and further includes a second intermediate MUX/DEMUX having complexity greater than said first intermediate MUX/DEMUX and less than said H.223 Annex C recommendation.

23. The computer readable medium of claim 15, wherein said intermediate multiplexing/demultiplexing processes includes a first intermediate process that has a process more complex than the H.223 recommendation and less complex than the H.223 Annex C recommendation and further includes a second intermediate process having complexity greater than said first intermediate process and less than said H.223 Annex C recommendation.

24. An adaptive multiplexing/demultiplexing method in an audio/visual system, comprising steps of:

(a) performing a first multiplexing/demultiplexing process having at least one of the complexity and performance of a first multiplexing/demultiplexing recommendation;

(b) performing a second multiplexing/demultiplexing process having at least one of the complexity and performance of a second multiplexing/demultiplexing recommendation, the complexity and performance of the second multiplexing/demultiplexing recommendation being higher than those of the first multiplexing/demultiplexing recommendation; and (c) inserting at least one intermediate multiplexing/demultiplexing process having at least one of different complexity and performance from the multiplexing/demultiplexing processes of steps (a) and (b).

25. The method of claim 24, wherein the first multiplexing/demultiplexing recommendation is the H.223 recommendation.

26. The method of claim 24 wherein the second multiplexing/demultiplexing recommendation is the H.223/Annex C recommendation.

* * * * *